United States Patent [19]

Saner

[11] 3,805,605
[45] Apr. 23, 1974

[54] ELECTRONIC MEASURING APPARATUS FOR MEASURING FORCES

[75] Inventor: Kaspar Saner, Dubendorf, Switzerland

[73] Assignee: Wirth, Gallo & Co., Zurich, Switzerland

[22] Filed: May 9, 1972

[21] Appl. No.: 251,818

[30] Foreign Application Priority Data
June 9, 1971 Switzerland.................... 8285/71

[52] U.S. Cl. ............................................. 73/143
[51] Int. Cl. ............................................. G01l 5/04
[58] Field of Search............ 73/DIG. 1, 141 R, 143; 177/210

[56] References Cited
UNITED STATES PATENTS
3,423,999  1/1969  Wirth et al...................... 73/141 R
3,565,193  2/1971  Wirth.............................. 73/67.2 X Primary Examiner—Jerry W. Myracle
Attorney, Agent, or Firm—Stevens, Davis, Miller & Mosher

[57] ABSTRACT

A force measuring device in which the tension of two electronically excited oscillating strings is measured. Means are provided for adjusting the output of the device.

10 Claims, 2 Drawing Figures

PATENTED APR 23 1974 3,805,605

ELECTRONIC MEASURING APPARATUS FOR MEASURING FORCES

This invention relates to an electronic measuring apparatus for measuring masses and forces, which is equipped with an evaluating device, and in which the value which is to be measured acts on the tension of two strings, which are excited by electronic means so that they oscillate laterally. The changes in the frequencies of the strings caused by the added mass or force enables the magnitude of this value to be calculated and to be displayed in the evaluating device. The two strings and two force-transmitting members, which serve to transmit a pretensioning force and also a force which is a function of the value to be measured, are attached to a central body in such manner that they radiate from the latter in a star-like configuration. Measuring apparatuses of this kind are known, for example, from Swiss Pat. No. 492,961 and U.S. Pat. No. 3,423,999.

When measuring apparatuses of this kind are used in practice, they must incorporate means to enable the steepness of the characteristic curve of the apparatus to be controlled. In conventional balances the steepness of the characteristic curve generally depends on the elastic elements and/or on the force-transmitting conditions of the system of levers within the apparatus. In contradistinction to this, in measuring apparatuses of the above-mentioned type the steepness of the characteristic curve is a function of the ratio between the pretensioning force exerted and a force which is proportional to the value which is to be measured by the apparatus. These two forces act on both of the strings, the first of these forces acting uniformly on both strings and the second non-uniformly. Essentially, the characteristic curve of the apparatus is a linear function of this ratio. Thus, any alteration in the pretensioning force results in a change in the steepness of this characteristic curve.

The invention has the object of enabling the pretensioning force to be controlled with a view to modifying the steepness of the characteristic curve of the apparatus.

According to the invention an electronic apparatus for measuring weights or forces comprises two pretensioned electronically excited oscillating strings each attached at one end to a movable central body, two force-transmitting members also attached at one end to the central body, the strings and force-transmitting members being so arranged that they radiate from the central body in a star-like configuration, the force-transmitting members serving respectively to transmit to the central body a pretensioning force and a force which is a function of the mass or force to be measured, and a pretensioning body which acts upon the one force-transmitting member to produce the pretensioning force, the pretensioning body being carried on a substantially horizontal arm of a lever having a swivel axis which is at least approximately horizontal with respect to the frame of the apparatus, the pretensioning body comprising a plurality of component bodies whose positions with respect to the pivot axis can be alternated independently and locked in the altered positions in order to adjust the apparatus.

An embodiment of the invention is diagrammatically illustrated in the accompanying drawing. In this drawing.

Figure 1:
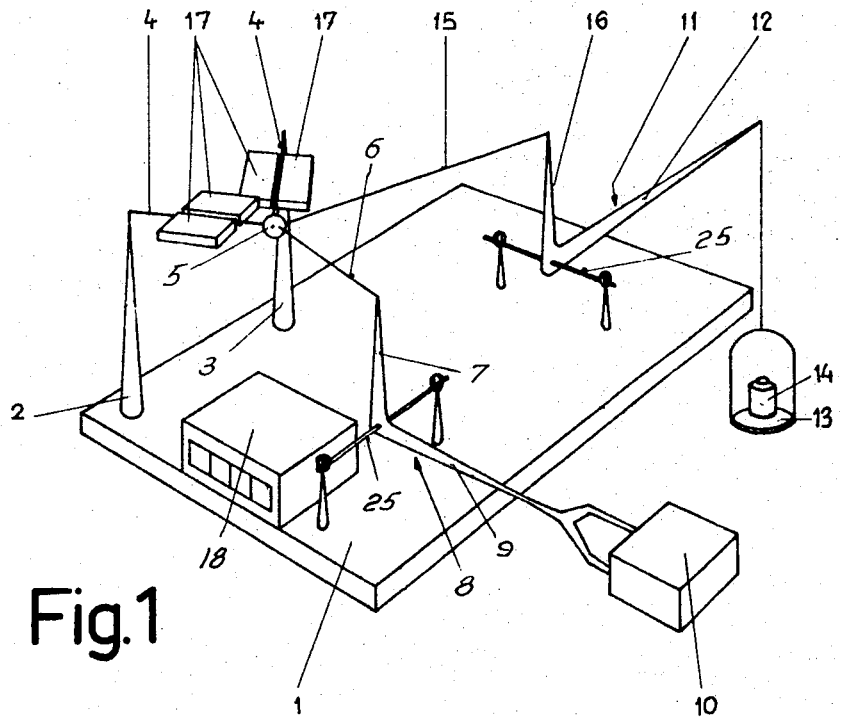
FIG. 1 is a view of the measuring apparatus as a whole.

The measuring apparatus or balance diagrammatically illustrated in FIG. 1 comprises a frame or base 1, on which two supports 2, 3 are fixed. A transversely oscillating string 4 is attached at one end to the upper end of each of these supports 2, 3. The other ends of the two strings 4 are attached to a movable central body 5. A wire 6 connects the central body 5 to the end of the upright arm 7 of a bellcrank 8 which is pivotally mounted to swing about axis 25 supported on the frame 1. The longer, approximately horizontal arm 9 of the bellcrank 8 carries a pretensioning body 10, the moment of the mass of this body 10 serving to pretension the strings 4. A second bellcrank 11 is pivotally mounted on the frame 1, the horizontal arm 12 of the bellcrank 11 carrying the diagrammatically illustrated balance pan 13, together with the object 14 which is to be weighed. A wire 15 connects the body 5 to the vertical arm 16 of the bellcrank 11 and, by way of the central body 5, exerts on the strings a force which is proportional to the mass of the object 14 to be weighed. Two exciter and pick-up heads 17 are arranged on the supports 2, 3, these heads 17 being connected to an evaluating and display device 18. In a known manner, in this evaluating and display device 18 a comparison is made between the frequencies of the strings 4 which are uniformly loaded by the known mass of the body 10, and which are additionally loaded, to differing extents and through the intermediary of bellcrank 11, wire 15 and central body 5, by the weight of the mass 14 to be weighed. The mass of this body 14 is obtained, in a manner known per se, from the comparison of these frequencies, this mass being displayed in digital form by the device 18.

Figure 2:
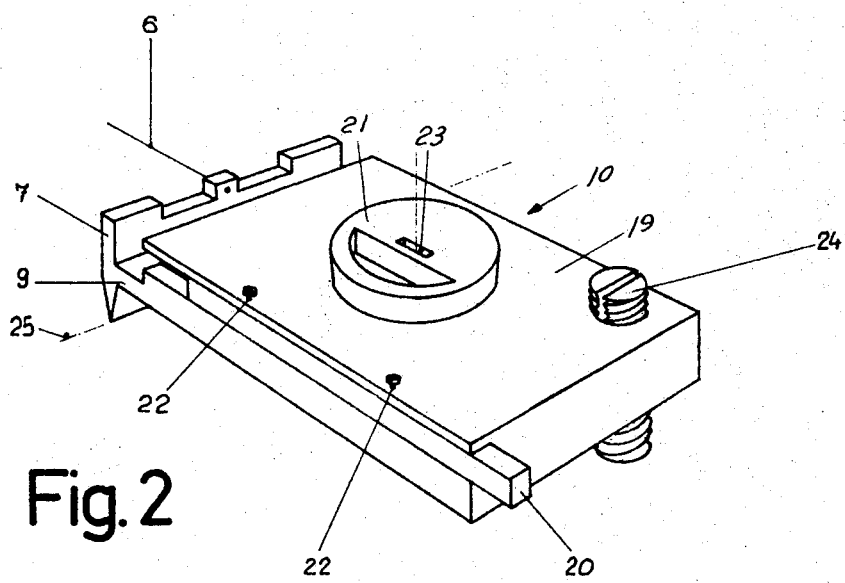
FIG. 2 illustrates the pretensioning body on an enlarged scale.

In FIG. 2 the mass 10, which serves to pretension the strings 4, is illustrated, together with bellcrank 8, on an enlarged scale. This body 10 comprises four component bodies: the component body designated as 19, which is rigidly attached to the arm 9, and also the component bodies 20, 21 and 24. Component body 20 is in the form of an elongate sliding block and is used for coarse adjustment of the steepness of the characteristic curve of the apparatus. This component body 20 can be secured in any desired position by means of the screws 22. This elongate block 20 is longitudinally movable in a groove, which is formed in the component body 19 and extends at least approximately horizontally and orthogonally with respect to the swivel axis 25 of the body 10. Component body 21 is in the form of an eccentric disc, and is used for effecting fine adjustment of the steepness of the characteristic curve of the apparatus. Slot 23 is used for the introduction of a suitable tool for the purpose of rotating the component body 21. This component body 21 could be rotatably mounted in a recess formed in the body 10. The component body 24, which is offset with respect to pivot axis 25 and is constituted by a self-locking screw, can be vertically positioned as required, and locked in the desired vertical position.

Initially the coarse adjustment of the required steepness of the characteristic curve of the measuring apparatus is arrived at by appropriately positioning the component body 20. Fine adjustment of this curve is then arrived at by turning the component body 21.

Thus, the effective mass of the composite body 10 relative to the swivel axis 25 controls the steepness of the characteristic curve of the measuring apparatus.

The component body 20 is slidable perpendicularly of the pivot axis 25. This component body 20 could also be aligned in a direction such as to make an acute angle with this pivot axis 25. It would also be possible to equip the apparatus with more than one component body 21, serving to accomplish fine adjustment.

The component body 24 is used for controlling the center of gravity of the composite body 10 in the vertical direction. This control is necessary for eliminating any tendency of the apparatus to tilt. More than one subsidiary body 24 of this kind could be provided in the apparatus.

I claim:

1. An electronic apparatus for use in measuring masses or forces comprising two pretensioned electronically excitable oscillating strings each attached at one end to a movable central body, two force-transmitting members also attached at one end to the central body, the strings and force-transmitting members being so arranged that they radiate from the central body in a star-like configuration, the force-transmitting members serving respectively to transmit to the central body a pretensioning force and a force which is a function of the mass or force to be measured, and a pretensioning body which acts upon one force-transmitting member to produce the pretensioning force, the pretensioning body being carried on a substantially horizontal arm of a lever having a swivel axis which is at least approximately horizontal with respect to the frame of the apparatus, the pretensioning body comprising a plurality of component elements whose positions with respect to the pivot axis can be altered independently and locked in the altered positions in order to adjust the apparatus.

2. An apparatus according to claim 1 in which the horizontal distance of the center of gravity of the pretensioning body from its swivel axis may be altered by altering the positions of the component elements.

3. An apparatus according to claim 2 in which one component element is slidable within a guideway formed in the pretensioning body in a direction substantially horizontal and orthogonal with respect to the swivel axis.

4. An apparatus according to claim 2 in which one component element is horizontally slidable in a guideway formed in the pretensioning body in a direction which makes an acute angle with the swivel axis.

5. An apparatus according to claim 2 in which at least one component element is arranged for rotation about a vertical axis within a guide recess formed in the pretensioning body, the center of gravity of said one component element lying outside said vertical axis.

6. An apparatus according to claim 1 in which one of the component elements serves to provide coarse adjustment of the distance of the center of gravity of the pretensioning body from the swivel axis while another component element is used for effecting fine adjustment of the distance.

7. An apparatus according to claim 1 in which one component element is horizontally slidable in a guideway formed in the pretensioning body in a direction which makes an acute angle with the swivel axis.

8. An apparatus according to claim 1 in which at least one component element is arranged for rotation about a vertical axis within a guide recess formed in the pretensioning body, the center of gravity of said one component element lying outside said vertical axis.

9. An apparatus according to claim 1 in which at least one component element is movable vertically relative to the pretensioning body.

10. An apparatus according to claim 9 in which the vertically movable component element is in the form of a self-locking screw which automatically locks itself in any adjusted position.

* * * * *